Inventor
Charles Lincoln Campbell,
By his Attorneys
Steward & McKay

Aug. 19, 1930.   C. L. CAMPBELL   1,773,258
COUNTER CURRENT CONTACTING APPARATUS
Filed Feb. 2, 1927   2 Sheets-Sheet 2

Inventor
Charles Lincoln Campbell
By his Attorneys
Steward & McKay

Patented Aug. 19, 1930

1,773,258

UNITED STATES PATENT OFFICE

CHARLES LINCOLN CAMPBELL, OF BOSTON, MASSACHUSETTS, ASSIGNOR TO E. B. BADGER & SONS COMPANY, OF BOSTON, MASSACHUSETTS, A CORPORATION OF MASSACHUSETTS

COUNTERCURRENT CONTACTING APPARATUS

Application filed February 2, 1927. Serial No. 165,420.

This invention relates to improvements in counter current contacting apparatus by which a liquid and a gas or vapor are brought into intimate contact with each other.

It has been common in the art heretofore to provide a counter current contacting apparatus comprising a so-called column having a plurality of horizontal plate devices sometimes called trays, each arranged to hold a layer of liquid and each provided with a plurality of bubblers whereby a vapor or gaseous fluid, admitted to the column beneath the plate devices, may pass upward through the bubblers and bubble through the liquid which flows along the trays. Liquid admitted to the upper part of the column travels over the plate devices seriatim, flowing downward from one plate device to another through suitable overflow conduits. The purpose of such apparatus is to cause the upward flowing vapor or gaseous fluid to be well subdivided into streams which meet the respective horizontal layers at a plurality of points in a plurality of horizontal planes, the endeavor being to obtain a very intimate contact of small portions of vapors or gaseous fluid with relatively thin layers of liquid. Apparatus of this general type is employed for absorption apparatus, as where a gas or vapor is to be absorbed by a liquid, and also is employed for distillation purposes, as where a liquid is to be concentrated or a fraction or fractions of a liquid is or are to be distilled off, in which case a vapor or heated gaseous fluid, such as a hot gas or steam, or vapors from a still, such as an oil still, is or are brought into contact with the liquid to heat the latter, or to concentrate the fractions.

It has long been known that column apparatus of the type hereinbefore referred to has not been as efficient as might be expected. One of the reasons for this inefficiency has been that most of the prior column apparatus did not maintain a proper relation between the lengths of travel of the liquid from any one bubbler at one horizontal plane to the corresponding bubbler alined with it or substantially alined with it in the next lower horizontal plane. As a consequence, at some parts of such prior apparatus, a portion of the ascending gaseous or vaporous fluid would encounter liquid which had traveled a relatively considerable distance between corresponding substantially alined bubblers while another portion would encounter liquid which had traveled a relatively inconsiderable distance from the corresponding preceding bubbler where it had been acted upon by the gaseous fluid. Hence the difference in composition of the liquid strata encountered at successive contacts of the vapor was different for different streams of vapor, thus leading to an inefficient action.

Attempts have been made heretofore to overcome the above-mentioned disadvantages by so constructing a column apparatus that the lengths of travel of liquid from bubbler to bubbler, in any series of bubblers in vertical alinement would be a constant for that series, that is to say, the lengths would be the same. However, the apparatus heretofore devised to accomplish the said result, involved more expensive construction than usual and introduced some mechanical difficulties, particularly in providing overflow pipes of suitable size for conducting the liquid from one plate device to another.

The object of the present invention is to provide a column apparatus of the type hereinbefore referred to, which will be relatively simple and economical in construction and at the same time will avoid the inefficiencies of the old prior art apparatus.

With this general object in view, and some others which will be obvious to those skilled in the art from the description hereinafter given, an apparatus embodying the invention comprises a column apparatus provided with means for compelling the liquid to travel in a series of circuits in horizontal planes, with substantially vertical overflows from one plane to the other, and with erect and generally vertical partitions or baffle plates, for the respective horizontal circuits of the liquid, which will compel the liquid to travel in a roundabout way over each circuit, by preventing it from passing directly from an inlet to an outlet, but in the same general direction in all the circuits, the result being that the lengths of travel of any given portions of liquid from bubbler to bubbler of a series of substantially alined bubblers is a constant. By constructing the apparatus in this way with substantially straight vertical overflow pipes from one plate device to another, the overflow pipe for one plate device being the inlet pipe for the next plate device below, with a baffle plate for each plate device, said baffle plate being between the inlet pipe and the overflow pipe for said plate device, the vertical overflow pipes are not in vertical alinement, but are arranged stepwise, that is, they are displaced transversely from a vertical line through the axis of the uppermost overflow pipe, the amount of displacement transversely increasing from the top down. Such a construction and arrangement of parts, although relatively simple and reasonable in cost, enables having the liquid travel in the same general direction horizontally on all the successive plates of the column. Thus one of the important desired conditions of operation, i. e. that the vapor or gas ascending vertically through bubblers in substantially vertical alinement at any given location on each successive column plate shall contact at each plate with liquid that varies substantially uniformly in composition from plate to plate, is satisfied to an extent sufficiently accurate for practical purposes. In the best embodiment of the invention, in which the casing of the column is cylindrical, the vertical overflow pipes may be considered as located each with its vertical axis in a radial plane, that is, in a plane through the central vertical axis of the column, each radial plane making a predetermined horizontal angle with the radial plane of the corresponding overflow pipe immediately above it. Furthermore, the horizontal angle between any two adjacent radial planes advantageously is substantially a constant for any one column apparatus.

The invention will now be more specifically described in connection with the accompanying drawings, which illustrate in a diagrammatic manner an embodiment of the invention particularly intended as a fractionating column intended to receive vapors from a still, it being understood, however, that the invention is not limited to such use but may be employed as a distillation apparatus and also, with equal advantage as absorption apparatus for absorbing gaseous fluids, such as gases or vapors, in liquids.

In the drawings—

Figures 1, 2:
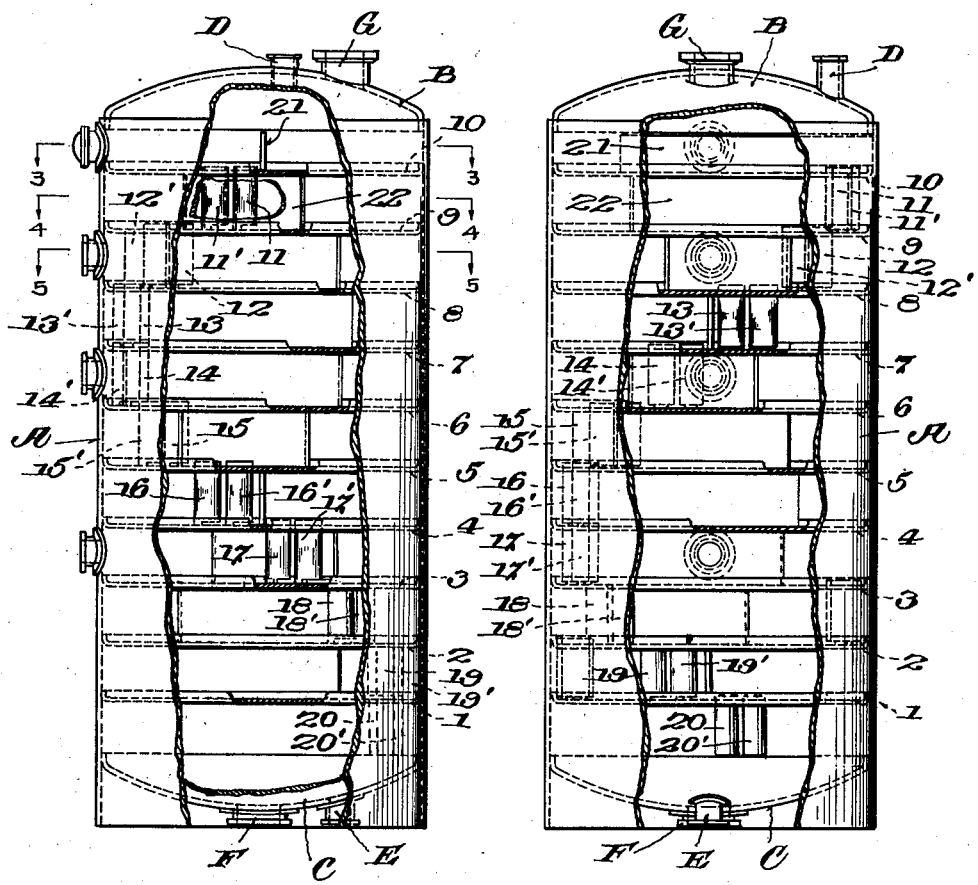
Figure 1 is a diagrammatic vertical section through the center of a column distilling apparatus embodying the invention.
Figure 2 is a similar view taken at right angles to Fig. 1.
Figure 3:
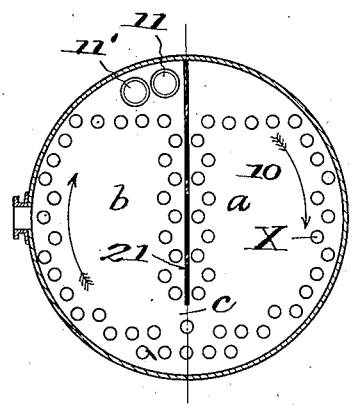
Figure 4:
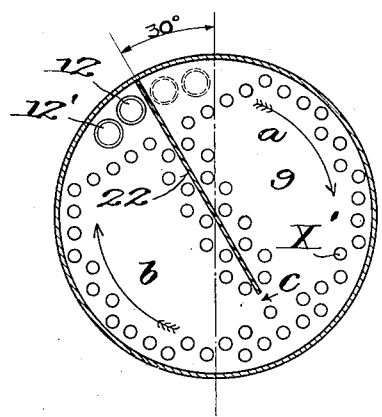
Figure 5:
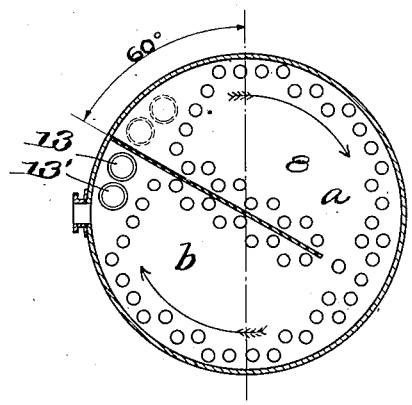
Figure 6:
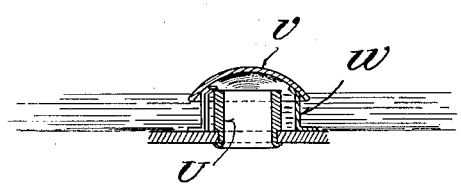

Figures 3, 4 and 5 are horizontal sections on the lines 3—3, 4—4 and 5—5 respectively of Fig. 1;

Figure 6 is a detail view illustrating one form of bubbler device.

Referring to the drawings, A is a shell or casing, in this case cylindrical, B is an upper head or top which may be domed, as shown, C is a lower head or bottom, which is shown as dished, D is a liquid-inlet pipe for conducting liquid to the column apparatus, E is a liquid-outlet pipe for withdrawing liquid from the apparatus, and F is an inlet for vapor, in this case assumed to be supplied to the apparatus from a still, the vapor in some cases including steam. At G is indicated an outlet for vapor. Within the casing A there is provided a series of superposed plate devices, usually in the form of trays, these being indicated by the reference numerals 1 to 10, inclusive, each tray device being provided with a plurality of bubblers of any desired or usual construction, each generally comprising a thimble such as indicated at U, Fig. 6, secured liquid tight in register with an opening in the plate device and having a baffle-cap such as shown at V, Fig. 6, which may be in the form of an inverted cup and is supported at a distance from the upper end of its thimble as for example by legs W, Fig. 6. The cap has a diameter larger than that of its thimble and its lower edge is arranged to dip slightly below the level of the liquid in the plate device. In practice, the bubblers are distributed substantially uniformly over the plate devices 1 to 10 inclusive. In effect, therefore, the bubblers of the column plates are arranged in substantially vertical series alined with each other vertically, or, at least the arrangement is such that the vapor may be considered as passing upward in a series of substantially vertical streams.

The plate devices divide the interior of the column apparatus into a series of chambers, viz: one between each pair of adjacent plate devices, a top chamber above plate device 10 and a bottom chamber below plate device 1.

Each plate device is provided with overflow means whereby liquid may overflow from one plate device to another below it except that for the lowest plate device 1, which discharges into the dished bottom C. It is an advantage of the present invention that this overflow means may consist of one pipe or a plurality of pipes, for example, two in the present case as indicated at 11 to 20 inclusive and 11' to 20' inclusive. These overflow pipes can be straight pipes and hence are easily installed. Furthermore, being straight and vertically arranged, they are very efficient in conducting the liquid from one plate device to the next. It is obvious that the overflow means for one plate device may be considered as the inlet means for the plate device below it. The construction of the apparatus is different from the prior art in that for the purpose of preventing the inlet liquid from flowing directly into the outlet of the same plate device and also to compel the liquid to make a complete circuit of its plate device from the inlet means to the outlet means of said plate device, the inlet means and the outlet means for a chamber are displaced horizontally relative to each other, and a baffle-device is provided between them, this baffle-device extending along and in contact with its plate device from one wall of the corresponding chamber toward but not entirely to the opposite wall of the same chamber. In the best embodiment of the invention, as illustrated in the drawings, each baffle-device is a baffle-plate which is located in a radial plane, its lower edge making a liquid tight contact with the upper surface of the plate device forming the bottom of the chamber in which said baffle-plate is located. Also in all chambers except the top one, its upper edge may make contact with the under surface of the plate device forming the ceiling or top wall of the chamber in which said baffle-plate is located. One vertical edge of the baffle-plate is in contact with the wall of its chamber adjacent to and between the inlet and outlet means for such chamber, while the other vertical edge of the baffle-plate extends toward but not entirely to the opposite wall of said chamber, thus leaving a passage for liquid around the free end of the baffle-plate. In other words, although the baffle-plate is a flat plate extending diametrically of the chamber, it is not as long as the diameter of the chamber. For example, it will be seen from Fig. 4 of the drawings, that the baffle-plate 22 for plate device 9 serves to divide its chamber into two compartments as indicated at $a$ and $b$, these being in communication at one end as indicated at $c$. The compartment $a$ may be considered as an inflow compartment as it receives the inflow of liquid from its inlet means, indicated in dotted lines, the liquid then flowing toward the junction $c$ of the two compartments. Compartment $b$ may be designated the outflow compartment, since it contains the overflow means and has a liquid flow from the junction $c$ of the two compartments to said overflow. This also applies to the other plates of the column, as in the case of plates 8 and 10, for example, illustrated in Figs. 3 and 5; and it will be seen that the liquid flows in the same general direction on all the plates, as indicated by the direction arrows (Figs. 3—5).

The top chamber of the apparatus has a baffle-plate, as indicated at 21, but this need not extend upward into contact with the domed top of the apparatus.

It is to be noted that the vertical baffle-plates between the plate devices serve not only to compel a roundabout flow of the liquid on the respective plate devices, that is to say, a flow in an orbital manner around the vertical axis of the column apparatus, but also tend to baffle any transverse flow of vapor, thereby superinducing a tendency of the vapor which has passed one bubbler to proceed vertically upward to the bubbler next above the one it has just passed. Furthermore, the vertically arranged baffle-plates serve very efficiently as stiffening and supporting members between the plate devices.

It will be observed that the overflow means for the respective plate devices are not in vertical alinement but are displaced in the same direction, and to progressively increasing amounts, from a vertical line through the uppermost overflow means. This permits the same directional flow of liquid horizontally on all the plates, as hereinabove pointed out. Where the column apparatus is cylindrical, the overflow means have an angular displacement relative to each other, the amount of this angular displacement, measured on a horizontal projection with the center of the column as a center, being a constant or substantially so.

In the example illustrated in the drawings, the baffle-plates are in vertical radial planes which are about 30° apart relative to each other and the overflow means for the different plate devices are similarly displaced angularly. This arrangement of the baffle-plates and overflow means permits the employment of straight vertically arranged overflow pipes and flat plates as the baffle-plates, thus greatly simplifying the construction and reducing the cost of the apparatus, while at the same time insuring a substantially uniform length of travel for the liquid from any one bubbler to the one below it in substantial vertical alinement with it. For example, the travel of liquid from the bubbler at X on plate device 10 to the corresponding bubbler X' on plate device 9 in a corresponding position comprises the length over plate device 10 from said bubbler X to the overflow 11 of said plate device 10, as well as the vertical distance downward through the overflow pipe to the inlet end of plate device 9, and also the length of travel over plate device 9 through its inflow compartment to said corresponding bubbler X' on plate device 9. In terms of angular measurement in a horizontal plane, it is clear that the liquid travels substantially 360° from one bubbler device to the next one below and in general alinement with it, if it be assumed that the liquid travels in a generally circular direction. Therefore, whatever be the angle passed over by the liquid on one plate device, before it falls through the overflow, it must pass through substantially the supplementary angle on the plate device below before reaching the corresponding substantially alined bubbler. The actual total length of the travel on the two plates, of course, depends upon the radial distance of the particular pair of bubblers under consideration, but owing to the fact that the outlets and inlets are close to the outer peripheries of the plate devices, the variations in length of travel between the substantially alined pairs of bubblers at the shortest radial distance from the central axis of the column and those at the maximum radial distance is not great enough to seriously affect the efficiency, and in any case it is true that the length of travel from one bubbler to another below and in alinement with it, is a constant for the whole vertical series of bubblers in vertical alinement.

The term "vapor" is used in a broad sense in the appended claims to denote either gas, or vapor, or both.

What is claimed is:

1. A column apparatus for absorption or distillation comprising a plurality of superposed transverse plate devices dividing the column into a plurality of chambers, means at the upper end of the column for supplying liquid to the uppermost plate device, an overflow pipe for each plate device arranged to conduct liquid from said plate device to the one immediately below it, the overflow pipes being out of vertical alinement with each other, the amount of displacement of each pipe from a vertical line through the uppermost overflow pipe increasing from the top downward and in the same direction, the overflow pipe from one plate device serving as the inlet pipe for the plate device below it, a series of baffle devices, one for each chamber bottomed by a plate device, each baffle device being located between the inlet pipe and overflow pipe for its chamber, and arranged to compel the liquid to flow in a roundabout way from the inlet pipe of a plate device to the overflow pipe of the same plate device and in the same general direction on all said plate devices, a plurality of bubbling devices for each plate device, for bringing vapor in contact with the liquid flowing upon said plate devices, and means for admitting vapor to the column beneath all of said plate devices.

2. A column apparatus for absorption or distillation comprising a casing having therewithin a plurality of superposed transverse plate devices dividing the column into a plurality of chambers, means at the upper end of the column for supplying liquid to the uppermost plate device, an overflow pipe for each plate device arranged to conduct liquid from said plate device to the one immediately below it, the overflow pipes being arranged within said casing out of vertical alinement with each other, the amount of displacement of each pipe from a vertical line through the uppermost overflow pipe increasing from the top downward and in the same direction, the overflow pipe from one plate device serving as the inlet pipe for the plate device below it, a series of baffle devices, one for each chamber bottomed by a plate device, each baffle device being located between the inlet pipe and overflow pipe for its chamber, and arranged to compel the liquid to flow in a roundabout way from the inlet pipe of a plate device to the overflow pipe of the same plate device and in the same general direction on all said plate devices, a plurality of bubbling devices for each plate device, for bringing vapor in contact with the liquid flowing upon said plate devices, the bubbling devices of the different plate devices being arranged so as to allow vapors to flow upward in substantially vertical streams, and means for admitting vapor to the column beneath all of said plate devices.

3. A column apparatus for absorption or distillation comprising a plurality of superposed transverse plate devices dividing the column into a plurality of chambers, means at the upper end of the column for supplying liquid to the uppermost plate device, a straight, vertically arranged overflow pipe for each plate device arranged to conduct liquid from its plate device to the one immediately below it, said overflow pipes being out of vertical alinement and having their axes in different radial planes through the central vertical axis of the column apparatus, the central horizontal angle between the radial plane through the uppermost overflow pipe and any overflow pipe below it increasing in value from the top downward, the angle between any two adjacent radial planes being substantially the same for all pairs of adjacent radial planes, each overflow pipe serving as an inlet pipe for the plate device below it, a series of baffle devices, one for each chamber bottomed by a plate device, each baffle device being located between the inlet pipe and overflow pipe for its chamber and arranged to compel the liquid to flow in a roundabout way from the inlet pipe of a plate device to the overflow pipe of the same plate device and in the same general direction on all said plate devices, a plurality of bubbling devices for each plate device, for bringing vapor in contact with the liquid flowing upon said plate devices, the bubbling devices of the different plate devices being arranged in sets in substantially vertical alinement, and means for admitting vapor to the column beneath all of said plate devices.

4. A column apparatus for absorption or distillation comprising a plurality of superposed transverse plate devices dividing the column into a plurality of chambers, means at the upper end of the column for supplying liquid to the uppermost plate device, an overflow pipe for each plate device arranged to conduct liquid from said plate device to the one immediately below it, the overflow pipes being out of vertical alinement with each other, the amount of displacement of each pipe from a vertical line through the uppermost overflow pipe increasing from the top downward and in the same direction, the overflow pipe from one plate device serving as the inlet pipe for the plate device below it, a series of baffle devices, one for each chamber bottomed by a plate device, each baffle device being located between the inlet pipe and overflow pipe for its chamber, and arranged to compel the liquid to flow in a roundabout way from the inlet pipe of a plate device to the overflow pipe of the same plate device and in the same general direction on all said plate devices, each of these baffle devices in the chambers which lie between the plate devices being a flat plate arranged to extend the full height of its chamber to serve as a transverse baffle for the gaseous fluid in said chamber and to brace the plate devices between which it extends, a plurality of bubbling devices for each plate device, for bringing vapor in contact with the liquid flowing upon said plate devices, and means for admitting vapor to the column beneath all of said plate devices.

5. A column apparatus for absorption or distillation comprising a plurality of superposed transverse plate devices dividing the column into a plurality of chambers, means at the upper end of the column for supplying liquid to the uppermost plate device, an overflow pipe for each plate device arranged to conduct liquid from said plate device to the one immediately below it, the overflow pipes being out of vertical alinement with each other, the amount of displacement of each pipe from a vertical line through the uppermost overflow pipe increasing from the top downward and in the same direction, the overflow pipe from one plate device serving as the inlet pipe for the plate device below it, a series of baffle devices, one for each chamber bottomed by a plate device, each baffle device being located between the inlet pipe and overflow pipe for its chamber, and arranged to compel the liquid to flow in a roundabout way from the inlet pipe of a plate device to the overflow pipe of the same plate device and in the same general direction on all said plate devices, each of these baffle devices in the chambers which lie between the plate devices being a flat plate arranged to extend the full height of its chamber to serve as a transverse baffle for the gaseous fluid in said chamber and to brace the plate devices between which it extends, a plurality of bubbling devices for each plate device, for bringing vapor in contact with the liquid flowing upon said plate devices, the bubbling devices of the different plate devices being arranged to allow vapor to pass upward through the column in substantially vertical streams and means for admitting vapor to the column beneath all of said plate devices.

6. In a counter-current contacting device for bringing vapor into contact with a plurality of layers of liquid, the combination with plate means for supporting liquid flowing in a series of circuits in superposed horizontal planes, a plurality of devices for conducting the liquid from one circuit to another seriatim, a series of bubbler devices located at each of said horizontal planes, the individual bubbler devices at each horizontal plane being substantially in vertical alinement with the corresponding individual bubbler devices of the other horizontal planes, the devices for conducting liquid from one circuit to another being out of vertical alinement and displaced step-wise with relation to each other, and baffle means for each such plate means arranged intermediate the points at which liquid is conducted to and from the same whereby vapor passing upward through a substantially vertically alined series of bubbler devices will contact at each horizontal plane with liquid that varies substantially uniformly in composition from plane to plane the total path for travel of the liquid from any one bubbler device to the one in substantial vertical alinement below it being practically constant for all the bubbler devices in the same vertical line.

7. In a column apparatus, the combination with a casing and a plurality of superposed plate devices therein, each having a baffle device whereby an inflow compartment and an outflow compartment are provided at each plate device, each of said compartments being connected at one end of its baffle device, of a straight vertical overflow pipe for each plate device, each such pipe being disposed within said casing and leading from the outlet end of the outflow compartment of its plate device to the inlet end of the inflow compartment of the plate device below it, and said baffle devices being angularly displaced successively, whereby liquid descending said column is compelled to travel in the same direction horizontally on all said plate devices, a plurality of bubblers for each plate device, means for conducting liquid to the inlet compartment of the uppermost plate device, and means for introducing vapor below said plate devices.

In testimony whereof I hereunto affix my signature.

CHARLES LINCOLN CAMPBELL.